(12) United States Patent
Hafenrichter et al.

(10) Patent No.: US 6,513,231 B1
(45) Date of Patent: Feb. 4, 2003

(54) SYSTEM AND METHOD FOR ASSEMBLY OF LARGE STRUCTURES USING MODULAR TRAVELING WORKSTATIONS

(75) Inventors: Joseph L. Hafenrichter, Des Moines, WA (US); Cliff G. Frome, Renton, WA (US); David Edgar Lisk, Kenmore, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/547,524

(22) Filed: Apr. 12, 2000

(51) Int. Cl.$^7$ ............... B23P 21/00; B28B 27/14; B23C 1/00
(52) U.S. Cl. ............ 29/721; 29/281.5; 29/56.6
(58) Field of Search ............ 29/33 K, 897, 29/428, 407.01, 429, 54, 56.6, 431, 559, 701, 705, 721, 281.1, 281.5, 26 A, 50, DIG. 7; 369/27.01; 414/589; 710/300; 73/718, 724; 439/41, 43, 132, 190; 403/56; 248/178.1; 15/268

(56) References Cited

U.S. PATENT DOCUMENTS

| | | | |
|---|---|---|---|
| 3,999,276 A | | 12/1976 | Brown et al. |
| 4,282,512 A | * | 8/1981 | Boggs et al. ............ 340/147 |
| 4,310,964 A | | 1/1982 | Murphy |
| 4,517,512 A | * | 5/1985 | Petrich et al. ............ 324/73 R |
| 4,674,181 A | | 6/1987 | Hamada et al. |
| 5,220,718 A | | 6/1993 | Speller, Sr. et al. |
| 5,373,764 A | | 12/1994 | Borzym |
| 5,621,970 A | | 4/1997 | Roberts et al. |
| 5,664,311 A | | 9/1997 | Banks et al. |
| 5,701,945 A | * | 12/1997 | McKibben et al. ......... 164/130 |
| 5,896,637 A | * | 4/1999 | Sarh ............ 29/34 B |
| 6,038,929 A | * | 3/2000 | Smith ............ 73/756 |

FOREIGN PATENT DOCUMENTS

| | | | |
|---|---|---|---|
| DE | 3413255 | * | 10/1985 |
| JP | 401135443 | * | 5/1989 |

OTHER PUBLICATIONS

NN83014153, Automated Assembly and Handling System, Jan. 1983, IBM Technical Disclosure Bulletin, vol. 25, Issue No. 8, p. 4153–4154.*

* cited by examiner

Primary Examiner—Gregory M. Vidovich
Assistant Examiner—John C. Hong
(74) Attorney, Agent, or Firm—Alston & Bird LLP

(57) ABSTRACT

The system includes stationary assembly jigs for supporting mechanical structures during assembly thereof, and a plurality of mobile, modular workstations that travel from one assembly jig to another. Each workstation interfaces with the assembly jigs and is configured to facilitate a unique set of work operations on the mechanical structures. The workstations can include worker platforms, parts storage modules, drill and fasten modules, tooless component indexing modules, self-contained cleaning modules, functional testing modules, and others. Docking members on the workstations and the assembly jigs enable the workstations to dock with the jigs for indexing the workstations to the jigs. The assembly jigs can include utility ports and the workstations can include couplers that engage the ports so that electrical, pneumatic, water, vacuum, and/or data communication can be established between the workstations and the jigs.

14 Claims, 4 Drawing Sheets

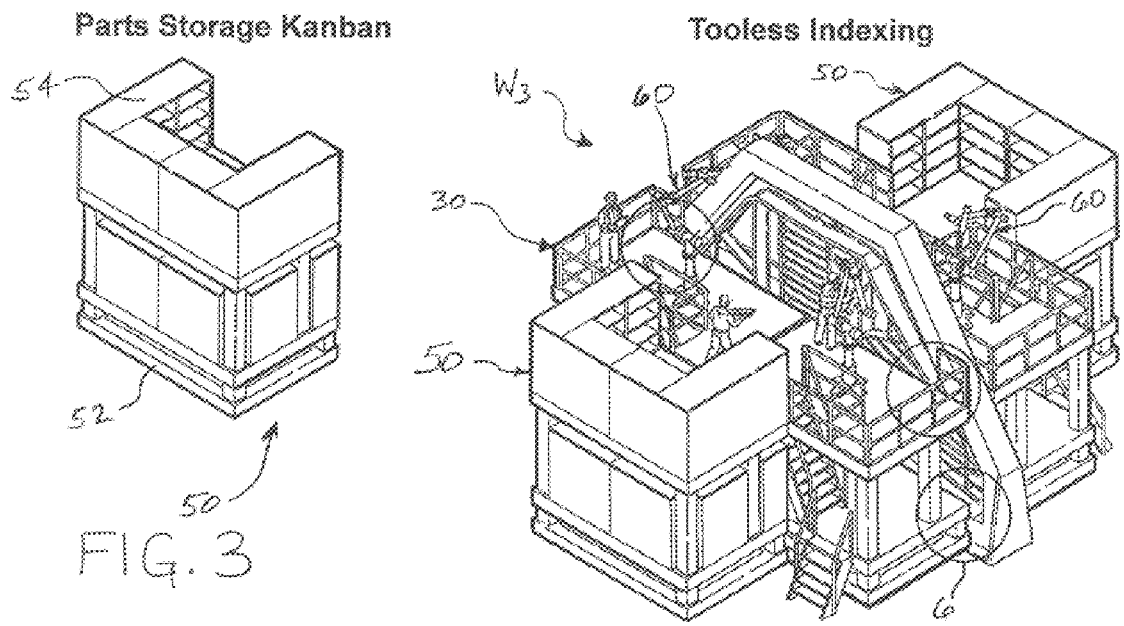
FIG. 3
FIG. 5
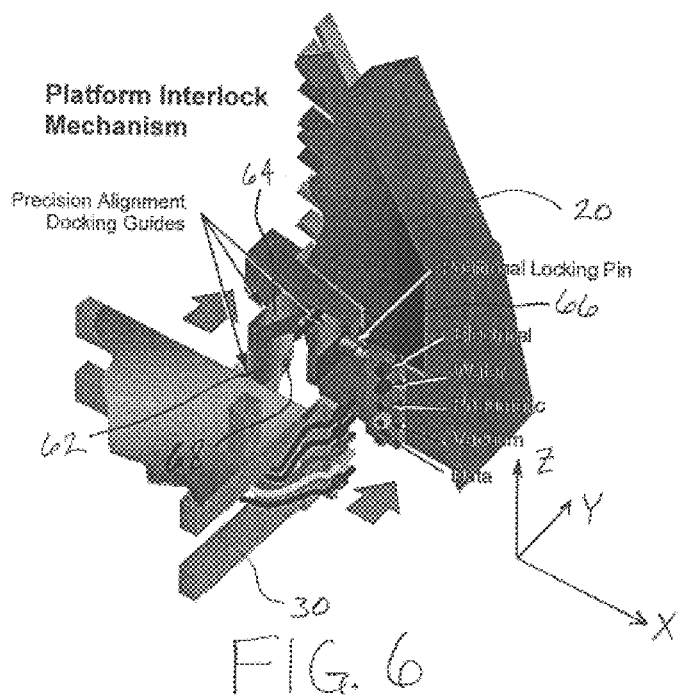
FIG. 6

Systems Installation

Drill and Fasten

Self Contained Cleaning Station

MPS Backpressure

Functional Test

SYSTEM AND METHOD FOR ASSEMBLY OF LARGE STRUCTURES USING MODULAR TRAVELING WORKSTATIONS

FIELD OF THE INVENTION

The invention relates generally to assembly-line systems for assembling a plurality of identical structures, and more particularly to the assembly of large mechanical structures such as aircraft wing boxes that are cumbersome to move from one assembly station to another.

BACKGROUND OF THE INVENTION

Henry Ford is generally regarded as the father of modern mass production. Ford recognized that great strides in efficiency of mass production could be realized by standardizing the design of an automobile so that parts could be interchangeably used from one automobile to another, and by dividing the assembly of an automobile into a number of different tasks. Ford also conceived that workers could perform more efficiently if each repetitively performed the same task or set of tasks on each automobile. Efficiency in the flow of products was improved by stationing workers at fixed workstations arranged along an "assembly line" and by moving each automobile along the line from one workstation to the next. Each workstation had the parts and equipment that its workers would need to perform their assigned tasks. Since Ford's pioneering work, it has become standard across virtually all industries to use moving assembly lines in the mass production of products.

Improvements in manufacturing efficiency and cost have also been achieved by improving the control of parts inventories and flow. One example is the advent of "just-in-time" inventory systems in which parts are replenished in the inventory at the rate they are used, so that a large inventory is not needed. The "kanban" (a Japanese term meaning "replenishment to order") inventory system is one version of this, in which the usage of each part is communicated from the user to the part supplier as the parts are used, and the supplier delivers parts of the same type and number as are used. In most cases, the delivered parts are received at a loading dock and are then transported from the loading dock to a central parts storage area where all parts used in the manufacture of the particular product are stored and catalogued. Alternatively, the parts can be transported from the loading dock to one or more parts storage areas proximate the point of use.

Moving assembly lines can be difficult to implement when the product is so large or delicate that it cannot be practically moved from one workstation to another. For instance, aircraft wing boxes for large commercial aircraft can be quite large and heavy. Accordingly, wing boxes have traditionally been assembled by keeping the wing boxes in fixed locations. Where the wing boxes are assembled in vertical orientations, custom-built worker platforms are positioned in proximity to a wing box so that workers can access all portions of the wing box. Teams of workers successively perform their assigned tasks on the wing boxes until they are completed. In the process, tools and equipment needed for a given set of tasks are retrieved by the workers from racks stationed on the assembly floor, carried to the wing box being assembled, and used for performing the tasks. Component parts to be installed in a wing box are generally stored in a number of parts storage racks located in the assembly building. Workers retrieve the parts from the racks and the parts are carried or transported to the wing box. Parts are replenished in the racks by transporting them from a part-receiving area (i.e., a loading dock) to the racks and placing them in their proper locations so that they can be subsequently retrieved. In most cases, the parts racks are not immediately adjacent to the wing box being worked on, and hence, workers must travel to the racks to retrieve the needed parts. Likewise, tools are typically not stored immediately adjacent to the wing box location, and thus the workers must travel to the tool storage area to retrieve needed tools.

The assembly method described above has certain drawbacks. One significant disadvantage is the time that is wasted by workers traveling from the assembly location to a tool or parts storage rack, retrieving the needed tools and/or parts, and traveling back to the assembly location. This inefficiency could be substantially reduced by storing the tools and parts at the point of use. In many cases, however, it may be impossible or undesirable to use space on the assembly floor for such purpose; for example, the cost per square foot for an assembly building is often much higher than that for a parts warehouse, such that it may be economically disadvantageous to store parts at the point of use.

A further drawback in the above-described assembly system is that elaborate and expensive positioning and fixturing devices have generally been necessary for precisely positioning and holding component parts in their proper locations so that they can be drilled and fastened to the wing box. For example, in many determinant assembly processes for large structures such as wing boxes, large 5-axis gantry machines are used, sometimes in conjunction with laser tracking devices, for positioning component parts and fastening the parts to the structure. These devices are relatively expensive.

SUMMARY OF THE INVENTION

The above needs are met and other advantages are achieved by the present invention, which provides a system and method for the assembly of large mechanical structures that cannot practically be moved from one workstation to another. In accordance with the principles of the present invention, the mechanical structures to be assembled are fixed in stationary assembly jigs spaced apart on an assembly floor. A plurality of different, specialized work operations are performed on each structure by successively moving a plurality of mobile workstations to the structure. Each workstation is designed to facilitate a particular set of work operations. In one embodiment of the invention for use in assembling aircraft wing boxes, the workstations can include a drilling and fastening workstation, a systems installation workstation, a functional test workstation, and a self-contained cleaning workstation. Each workstation comprises a mobile module that can travel along the assembly floor from one assembly jig to the next. One or more of the workstations include a worker platform facilitating worker access to the structure being assembled.

Advantageously, at least one of the workstations includes a parts storage module for storing component parts to be installed in the mechanical structures. The required tools for the assembly tasks can also be stored in the parts storage module. Thus, the parts and tools needed for performing a given set of tasks are located immediately adjacent the point of use, thereby substantially reducing the time required for retrieving parts and tools. Preferably, the parts storage module(s) can be moved to a part-receiving area (e.g., a loading dock) for directly receiving parts when they are delivered by the supplier, thereby eliminating central inventory storage. The parts storage module(s) can interface with the worker platform(s) so that workers on a worker platform can easily retrieve parts or tools from the parts storage module without leaving the platform.

In one embodiment of the invention, one or more of the workstations include docking members and the assembly jigs include cooperating docking members that engage the docking members of the one or more workstations for aligning the workstations with the assembly jigs. This enables the workstations to index to the assembly jigs so that part positioning and fixturing devices mounted on the workstations can accurately position component parts relative to the mechanical structure.

Advantageously, at least one workstation includes one or more indexing devices for positioning components to be installed in the mechanical structure so that the components can be affixed to the mechanical structure. The indexing devices can comprise indexing arms that are mounted on a mobile worker platform. The platform indexes to the assembly jig, preferably by way of the docking members, so that the indexing arms can repeatably and accurately position components relative to the mechanical structure. As an alternative to indexing arms, other indexing devices such as laser trackers or photographic measurement systems can be mounted on the worker platform for positioning parts.

In one embodiment, at least one workstation comprises a fixturing apparatus operable to hold a subassembly to be secured to the mechanical structure, and operable to transport the subassembly to one of the assembly jigs and to position the subassembly relative to the mechanical structure such that the subassembly can be attached to the mechanical structure.

In many cases, one or more of the workstations will require a supply of electrical power for operating equipment on the workstation. Advantageously, each of the assembly jigs includes an electrical coupling member connected to a source of electrical power, and each workstation requiring electrical power includes a cooperating electrical coupling member operable to mate with the electrical coupling member of each assembly jig when the workstation docks with the assembly jig, whereby electrical power is supplied from the assembly jig to the workstation. The assembly jigs can also have fluid coupling members and/or data coupling members that mate with corresponding fluid and data coupling members in one or more workstations so that fluid and/or data transfer between the workstation and the assembly jig can occur. For example, pneumatic tools such as drills can be used in a workstation, and the air supply for the tools can be delivered through an air supply coupling member on the assembly jig that mates with an air supply coupling member on the workstation.

In one embodiment of the invention, one of the workstations comprises a cleaning station operable to perform cleaning operations on the mechanical structure. The cleaning station preferably comprises two traveling modules operable to engage each assembly jig from opposite sides thereof. Each module includes half of a containment shell, and the mechanical structure is enclosed in the containment shell when the modules engage the opposite sides of the assembly jig. Automatic spray cleaning of the mechanical structure can be performed within the containment shell to sluice debris and deposits from the structure.

One workstation can comprise a testing module operable to perform functional testing operations on the mechanical structure. Preferably, the testing module includes equipment for functional testing of all electrical and fluid systems installed in the mechanical structure. The time-wasting practice of retrieving test equipment from various locations around the assembly area is thereby eliminated.

When the invention is adapted to the assembly of aircraft wing boxes, there preferably are a plurality of vertical assembly jigs stationed on the assembly floor for fixturing the wing boxes in vertical orientations. The mobile worker platforms interface with the assembly jigs so that workers have access to the opposite major surfaces of the wing boxes. The worker platforms are of a common basic design, which is then customized for each workstation by installing data stations, work benches, utility ports, and other features, that are adapted to the particular assembly operations to be performed. The parts storage modules can interface with the worker platforms, and are also of a common basic design that is then customized with appropriate shelving and cabinetry for containing the particular parts and tools needed for each workstation.

Wing substructure fit-up is accomplished by a tooless indexing workstation comprising a worker platform on which are mounted one or more three-dimensional indexing devices for positioning the substructure. The tooless indexing workstation indexes to the assembly jigs by way of a platform interlock system including docking members on the platform and the assembly jigs that interlock to align the platform with the jigs.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 3 is a perspective view of a parts storage module;

FIG. 5 is a perspective view of a tooless indexing workstation and associated parts storage modules positioned at an assembly jig for fit-up and attachment of the wing substructure using tooless indexing arms mounted on the worker platform of the workstation;

FIG. 6 is an enlarged view of a portion of FIG. 5, showing a docking system for aligning the workstation with the assembly jig and a utilities coupling system for establishing electrical, water, pneumatic, vacuum, and data communication between the workstation and the assembly jig;

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
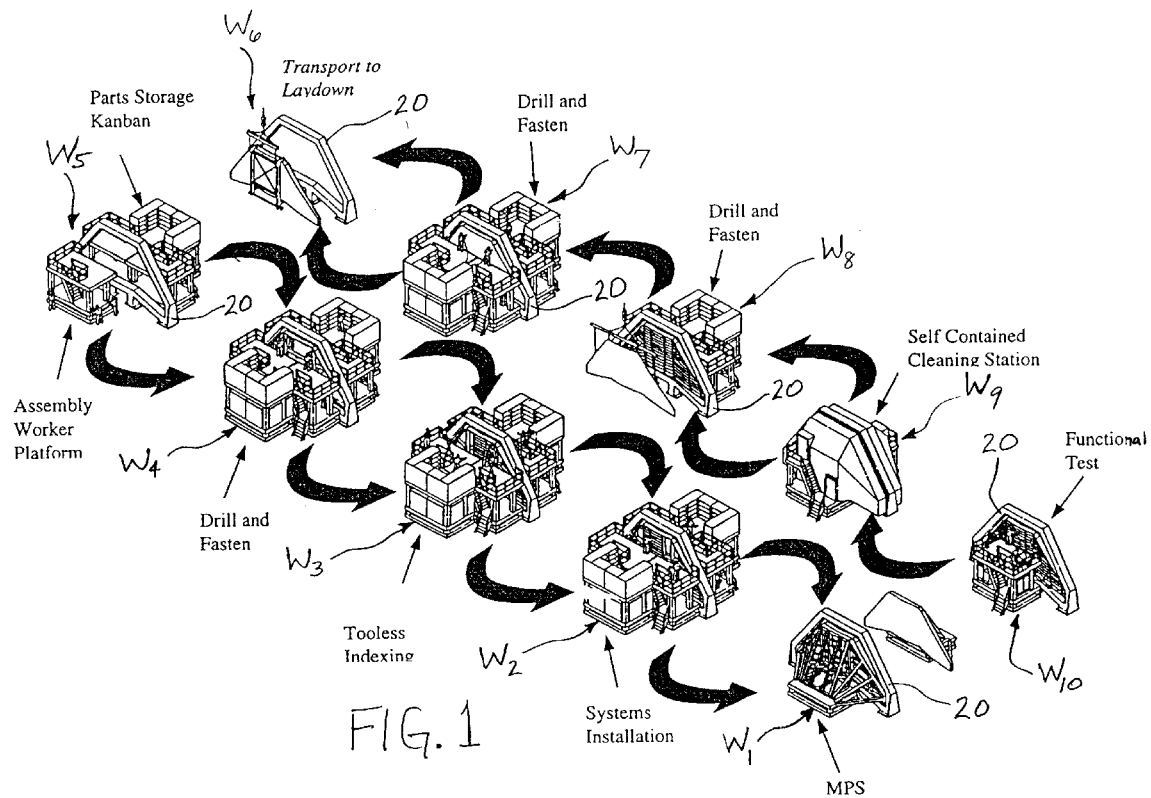
FIG. 1 is a diagrammatic perspective view of an assembly system in accordance with one embodiment of the invention, showing the workstation flow for assembly of aircraft wing boxes.

With reference to FIG. 1, an exemplary assembly system in accordance with one embodiment of the invention is depicted. The assembly system includes a plurality of vertical assembly jigs 20 fixed on an assembly floor in spaced-apart relation. Each assembly jig 20 is operable to secure a wing box in a fixed position. In the illustrative embodiment, the wing boxes are fixed in vertical orientations, which facilitates worker access to the opposite major surfaces of the wing boxes. The assembly system includes a plurality of mobile, modular workstations $W_1$ through $W_{10}$ that are operable to travel along the assembly floor independently of one another. The workstations are operable to interface with each assembly jig and the wing box secured therein. Each workstation is designed to facilitate a unique set of work operations on the wing box. When all of the workstations $W_1$ to $W_{10}$, in order, have visited a given wing box and the work operations associated with each workstation have been performed on the wing box, the assembly of the wing box is complete. Although the embodiment of the invention depicted in FIG. 1 includes a like number of assembly jigs 20 and workstations $W_i$, it will be understood that the invention can be practiced with any number of assembly jigs 20 from one to as many as desired. Moreover, although ten workstations are shown, it will be understood that the invention is not limited to any particular number of workstations.

Advantageously, there is some degree of commonality among the various workstations $W_i$, as will become apparent from the description of the workstations below. More particularly, some of the workstations employ a worker platform, and the basic design of the worker platform preferably is common to all of the workstations that have the platform. Similarly, some of the workstations employ a parts storage module, and the basic design of the parts storage module preferably is common to all of the workstations that have it.

Figure 2:
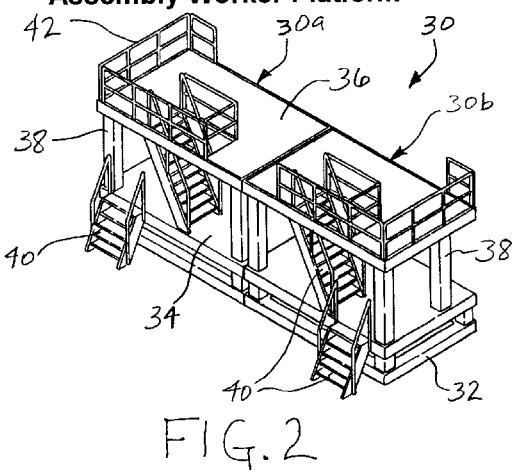
FIG. 2 is a perspective view of a worker platform.

FIG. 2 depicts one embodiment of a worker platform 30 in accordance with the invention. The worker platform 30, as all of the workstations, includes a pallet 32 that forms the base for the platform. The pallet 32 is operable to travel along the assembly floor. For the greatest convenience and flexibility in the practice of the invention, the worker platform 30 and the other workstations advantageously have wheels (not shown) that enable them to travel anywhere along the assembly floor; however, it is also conceivable that the workstations could be mounted on rails (not shown) that run along the assembly floor alongside the assembly jigs. The worker platform 30 includes a lower platform 34 mounted atop the pallet 32, and an upper platform 36 spaced above the lower platform and supported on columns 38. Advantageously, the worker platform 30 can be formed in two complementary halves 30a and 30b that can be rolled along the assembly floor independently of each other and can be placed end-to-end as shown in FIG. 2. The platform 30 includes stairs 40 for accessing the lower platform 34 from the floor, and for accessing the upper platform 36 from the lower platform. The upper platform 36 includes a safety railing 42 along its sides, except that a majority of the length of the front side of the upper platform (i.e., the side that is adjacent an assembly jig and wing box during use) does not have the safety rails so that workers can access the wing box when the worker platform is adjacent the assembly jig. Furthermore, the rear side of the upper platform 36 does not include a safety railing over part of its length so that a parts storage module, further described below, can interface with the worker platform and workers on the platform can access the parts storage module.

As noted above, many of the workstations employ the basic design of the worker platform 30 described above. Using this basic construct, each workstation module is customized with data stations, workbenches, utility ports, and other features, so as to create specialized workstations tailored to each set of tasks in the assembly sequence for the wing boxes.

FIG. 3 depicts a parts storage module 50 in accordance with the invention. The parts storage module 50 includes a mobile pallet 52 that can travel along the assembly floor. The parts storage module 50 essentially comprises a two-level platform similar to the worker platform 30, except that storage cabinets 54 run along at least one side, and preferably three sides, of both the lower and upper platforms. The parts storage module 50 can be moved against the rear side of a worker platform 30 so that the open side of the module is accessible to workers on the platform 30, as shown for example in FIG. 7. The parts storage modules 50 are of a common basic design, which is then tailored to a particular set of assembly tasks by installing customized shelving and cabinetry to house the particular parts and tools needed for a given set of assembly tasks. Thus, in the storage cabinets 54, component parts (e.g., fasteners, brackets, fittings, etc.) and/or tools (e.g., drills, riveters, etc.) needed for the particular set of assembly tasks of a workstation can be stored. Having the parts and tools at the point of use greatly reduces the amount of non-value-added time required for retrieving the parts and tools needed for each assembly step.

To set up a workstation having a worker platform 30 and parts storage module 50, first the worker platform 30 is moved along the assembly floor until it is adjacent an assembly jig 20. As further described below, the worker platform 30 may dock with the assembly jig 20 so that the platform is placed in a known, repeatable location relative to the assembly jig, and so that utilities can be connected between the assembly jig and the platform. Then, the parts storage module 50 is moved until it is adjacent the rear side of the worker platform 30. The parts storage module 50 can be mechanically coupled with the worker platform, if desired, so that the two cannot be inadvertently separated during assembly operations. The workers on the worker platform 30 have to travel only a short distance to enter the parts storage module 50 for retrieving parts and tools. Once the set of assembly operations have been completed on a given wing box, the parts storage module 50 is separated from the worker platform 30, and the parts storage module and worker platform are moved to the next assembly jig, if any.

The invention enables an improvement in the way that parts are inventoried. To this end, the parts storage module 50 can be moved to a loading dock or other part-receiving area of the manufacturing facility, and parts can be loaded directly from a delivery truck onto the parts storage module. Thus, a central inventory of parts can be eliminated; instead, each workstation that requires access to parts has its own mobile inventory that travels with the workstation from one assembly jig to another. It is expected that this type of parts storage system can lead to substantial improvements in efficiency of parts flow from the supplier's delivery truck to storage, and from storage to the point of use, relative to a conventional system having a fixed central storage location for all parts used in all assembly operations.

Figure 4:
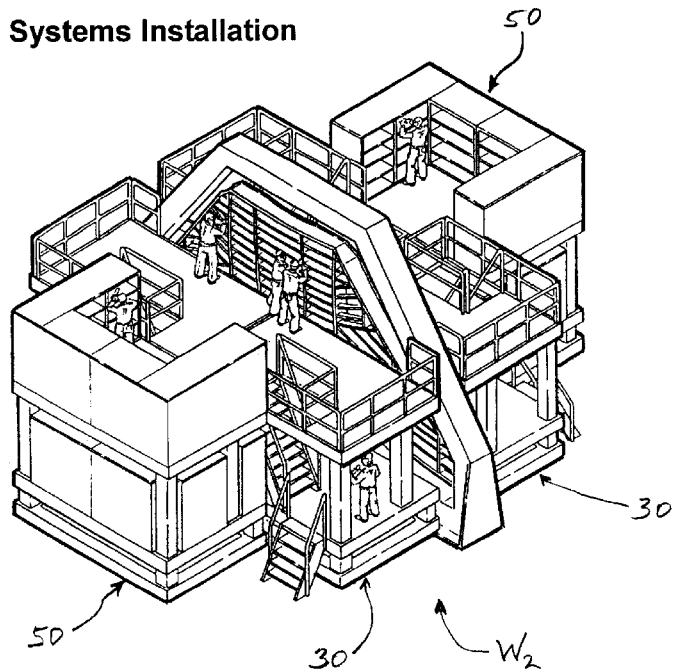
FIG. 4 is a perspective view of a systems installation workstation and associated parts storage modules positioned at an assembly jig for installation of systems such as hydraulic, electrical, and fuel systems.

Using the basic worker platform and parts storage modules as the basic building blocks, specialized workstations are created. Thus, FIG. 4 shows a systems installation workstation $W_2$ in position at an assembly jig 20. The workstation includes worker platforms 30 on opposite sides of the assembly jig, and parts storage modules 50 for each worker platform. The workers are shown installing various electrical, hydraulic, and fuel systems in the wing box. Advantageously, the workers move with the systems installation workstation, so that they perform the same systems installation tasks for each wing box, thereby becoming highly skilled at such tasks.

FIG. 5 shows a tooless component indexing workstation $W_3$ in position at an assembly jig 20. The tooless indexing workstation is designed to facilitate determinant assembly of the wing box subassemblies, by using three-dimensional indexing systems to accurately position one or more subassemblies, such as a wing substructure, in a position in which they are to be affixed to the wing box so that workers can fasten them in place. Conventional determinant assembly of wing structures typically employs a large 5-axis gantry machine and/or a laser tracker apparatus for positioning parts in relation to each other. In contrast, the tooless component indexing workstation of the illustrated embodiment employs relatively inexpensive three-dimensional indexing arms 60, such as FaroArms® manufactured by Faro Technologies of Lake Mary, Fla. The indexing arms 60 are mounted on a worker platform 30 of the type previously described. The arm 60 is essentially a "three-dimensional tape measure" that enables workers to accurately determine the 3-D location of any point in a spherical space surrounding a center point of the arm. The frame of reference of the arm 60 is the worker platform 30. Thus, workers can repeatably and accurately position a component relative to the worker platform. As previously noted, instead of indexing arms, the tooless component indexing workstation can employ other types of three-dimensional indexing devices such as laser trackers or photographic measurement systems.

In order to repeatably and accurately position a component relative to a wing box, it is essential that the wing box be repeatably and accurately positioned relative to the assembly jig 20, and that the worker platform 30 be repeatably and accurately positioned relative to the assembly jig. The positioning of the wing box within its assembly jig is not described in detail herein, as such is well within the capabilities of a person of ordinary skill in the art of aircraft structure assembly systems. As for the positioning of the worker platform 30 relative to the assembly jig 20, this is accomplished in accordance with the illustrated embodiment of the invention by providing cooperative docking members 62 and 64 on the worker platform 30 and the assembly jig 20, respectively, as shown in FIG. 6. The docking member 62 on the worker platform 30 advantageously comprises a tongue or pin rigidly affixed to the worker platform. The docking member 64 on the assembly jig 20 defines a slot or receptacle configured to receive the docking member 62 thereinto. The assembly jig docking member 64 preferably defines a datum surface in each of three mutually orthogonal directions, and the docking member 62 includes a corresponding datum surface in each of three mutually orthogonal directions. The docking members are designed to cause each datum surface of the worker platform docking member 62 to rest against and align with the corresponding datum surface of the assembly jig docking member 64, thereby aligning the worker platform with the assembly jig in all directions.

More particularly, in the illustrated embodiment, the assembly jig docking member 64 includes a positional locking pin 66 that engages a corresponding hole 68 in the docking member 62. The center axis of the hole 68 thus is aligned with the center axis of the pin 66 when the pin is engaged in the hole, thereby aligning the worker platform and assembly jig in the vertical (Z-axis) and front-to-back (Y-axis) directions. Alignment of the worker platform relative to the assembly jig in the side-to-side (X-axis) direction is accomplished by a close-tolerance fit in the X-axis direction between the docking member 62 and the receptacle defined by the docking member 64. The worker platform 30 must also be aligned with the assembly jig 20 in the rotation sense about the X-axis; as but one example of the way this can be accomplished, the worker platform 30 can include docking members 62 that are spaced apart in the vertical (Z-axis) direction, and the assembly jig 20 can include corresponding docking members 64 spaced apart in the vertical direction. The worker platform 30 advantageously also has more than one docking member 62, and the assembly jig 20 has a like number of docking members 64, spaced apart in the X-axis direction. The positional locking pins 66 preferably are actuatable so that they can be retracted to disengage them from the holes 68 when it is desired to separate the worker platform from the assembly jig.

Accordingly, when the worker platform 30 docks with the assembly jig 20 (i.e., when all of the platform docking members 62 are properly engaged with their counterpart assembly jig docking members 64), the frame of reference of the worker platform is indexed to the assembly jig. This ensures that the positioning arms 60 are able to repeatably and accurately position a component relative to the wing box. Once a part is positioned in the proper location, it can be temporarily secured in various ways, such as by using cleco fasteners, clamps, or the like, and then the part is permanently attached by installing fasteners.

FIG. 6 also illustrates a further feature of one embodiment of the invention. On the various workstations, there is a need for certain utilities to be provided for operating equipment on the workstations. For example, electrical power is used for operating computer terminals and other equipment; pneumatic equipment such as pneumatic drills and the like require a supply of pressurized air; vacuum may be required for operating devices such as vacuum clamps; water may be required for cleaning the assembly; and data may have to be exchanged between the workstation and the assembly jig. To these ends, the assembly system preferably includes coupling members on each assembly jig, and cooperative coupling members on one or more of the workstations. When the workstation docks with the assembly jig, the coupling members interface with each other so as to establish communication between the assembly jig and the workstation.

With reference to FIG. 6, the assembly jig 20 includes an electrical port, a water supply port, a pneumatic supply port, a vacuum port, and a data port. Similarly, the worker platform 30 includes a quick-disconnect electrical coupler, a quick-disconnect water coupler, a quick-disconnect pneumatic coupler, a quick-disconnect vacuum coupler, and a quick-disconnect data coupler, that can be connected to the corresponding ports in the assembly jig. Quick-disconnect fluid and electrical couplers are well known, and hence are not described in detail herein. The couplers on the worker platform can be manually connected to the ports in the assembly jig, or can be designed to automatically couple with the ports when the worker platform docks with the assembly jig.

Figure 7:
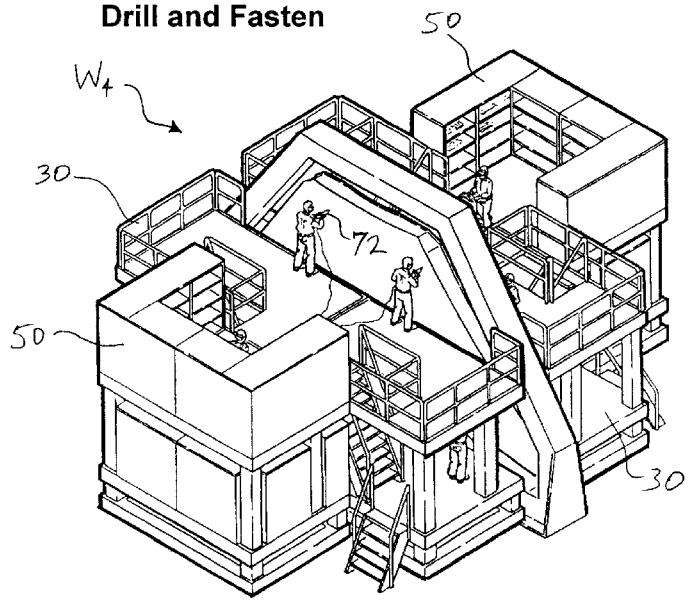
FIG. 7 is a perspective view of a drill and fasten workstation and associated parts storage modules positioned at an assembly jig for drilling and fastening component parts in the wing box.

FIG. 7 depicts a drill and fasten workstation $W_4$ for attaching a wing skin to the wing box in accordance with the invention. The workstation includes worker platforms 30 and associated parts storage modules 50. Workers use drills 72 to drill holes in the wing skin and in the wing box, and secure the skin by installing fasteners in the holes. The drills 72 can be pneumatically powered, and air can be supplied to them via the pneumatic port in the assembly jig and the pneumatic coupler on the worker platform. Alternatively, instead of using hand-held drills, portable numerically controlled drilling machines can be mounted to the worker platform for performing drilling operations.

Figure 9:
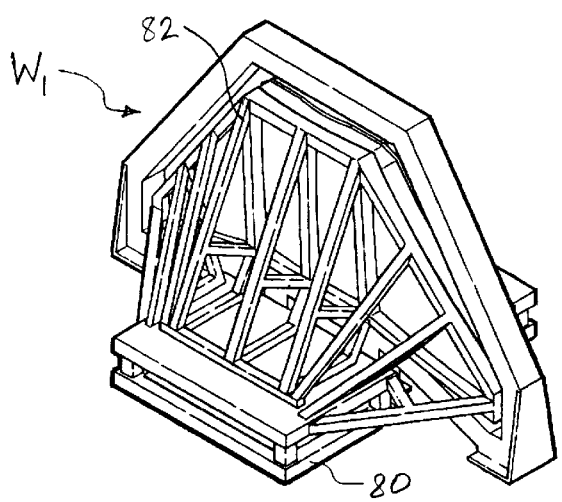
FIG. 9 is a perspective view of a wing skin fixturing workstation for holding and transporting a wing skin, shown interfaced with an assembly jig so that the wing skin can be attached to the wing box.

The assembly system can include a wing skin fixturing workstation $W_1$ as shown in FIG. 9 for fixturing and transporting a wing skin to a wing box so that the skin can be attached to the wing box. The workstation comprises a mobile pallet 80 that can travel along the assembly floor and a fixturing structure 82 supported atop the pallet for fixturing a skin. The wing skin fixturing process is accomplished by first coating all interface areas of the wing skin with a moldable plastic shim, preferably formed of a viscous gap-filler compound that hardens when exposed to air for a sufficient period of time. Once coated, the wing skin is moved into position adjacent the wing box substructure, preferably indexing to the assembly jig. Backpressure is applied to the wing skin through a series of toggle clamps (not shown) and a series of inflatable bladders (not shown) disposed on the fixturing structure 82, which serve to press the wing skin against the wing box substructure. As a result of the backpressure, the moldable plastic shim is compressed to a minimum thickness; while compressed, the shim is allowed to harden. In this manner, a custom-formed shim is provided for the wing skin, thus filling any gaps or imperfections between the skin and the substructure surfaces. The fixturing workstation can index to the assembly jig by employing docking members 62, 64 (FIG. 6) on the workstation and the assembly jig as previously described.

Figure 8:
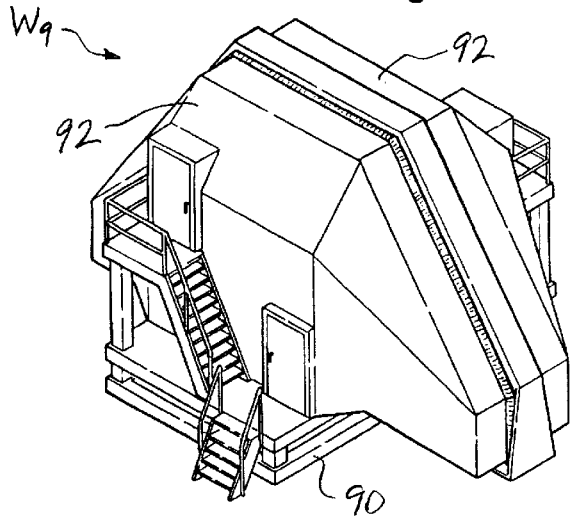
FIG. 8 is a perspective view of a self-contained cleaning workstation positioned so as to contain the wing box so that automated cleaning of the wing box can be performed.

FIG. 8 shows a cleaning workstation $W_9$ for automated cleaning of a wing box assembly after the assembly operations have been completed. The cleaning workstation comprises a pair of mobile pallets 90 each supporting one half of a containment shell 92. The shell halves approach an assembly jig and wing box from opposite sides thereof and engage the assembly jig therebetween, sealing against the assembly jig. Thus, the wing box is contained within the closed containment shell 92. An automated spray wash system (not shown) within the shell is operated to sluice all debris and deposits from the wing box interior. Water can be supplied to the spray wash system via the water port and water coupling, and used water can be evacuated from the shell via the vacuum port and vacuum coupling as described above.

Figure 10:
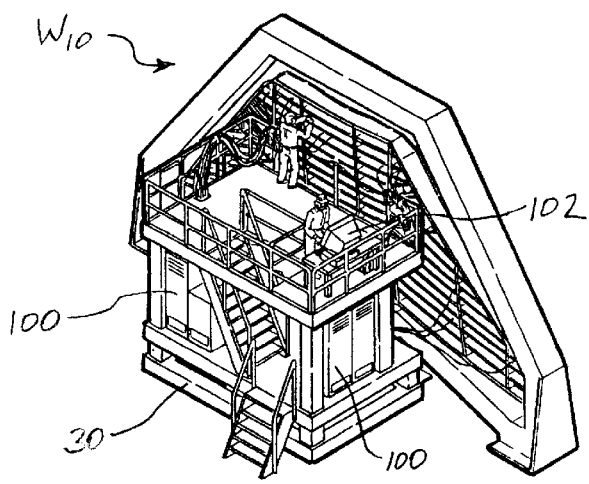
FIG. 10 is a perspective view of a functional testing workstation positioned at an assembly jig for functional testing of the various systems of the wing box assembly.

FIG. 10 depicts a functional testing workstation $W_{10}$ for testing the functionality of various electrical, hydraulic, and fuel systems installed in the wing box assembly. The testing workstation comprises a worker platform 30 on which functional test equipment 100 is installed. Workers can monitor and control test procedures at computer terminals 102. Preferably, all of the equipment needed to complete the testing sequence of a wing box assembly is contained within the testing workstation. Electrical power can be supplied to the testing equipment via the electrical port and electrical coupler, and pressurized air can be supplied via the pneumatic port and coupler, as previously described.

Additionally, data communication can be established between the workstation and the assembly jig via the data port and coupler. From the foregoing, it will be appreciated that the workstations of the assembly system function as islands of specialization, each docking with a fixed assembly jig so that the assigned tasks of the workstation can be completed. When all workstations have visited a given assembly jig, the wing box assembly is complete and can be removed to final assembly. The workstations thus enable the benefits of the assembly-line process (which derive from worker specialization and task repetition) to be achieved even though the wing boxes are too large and heavy to be practically moved from workstation to workstation. There is no known prior assembly system for aircraft structures in which workstations have been constructed as specialized, task-specific, mobile modules that travel between fixed assembly stations.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A modular assembly system for assembly of large mechanical structures, comprising:
   a plurality of stationary assembly jigs each operable for fixing a mechanical structure in a fixed position, the jigs being spaced apart and arranged in a predetermined sequence along a floor; and
   a plurality of modular traveling workstations each operable to perform work operations on the mechanical structure different from the work operations performed by the other workstations, the workstation operable to travel along the floor independently of one another and sequentially engage each jig in accordance with said predetermined sequence and perform their respective work operations on the mechanical structure held in each jig.

2. The modular assembly system of claim 1, wherein at least one jig and workstation have cooperative clocking members enabling the workstation to dock with the jig, the docking members in a docked condition positioning the workstation in a fixed predetermined position relative to the jig and holding the workstation in said predetermined position throughout the work operations performed by the workstation.

3. The modular assembly system of claim 2, further comprising cooperative coupling members on said at least one jig and workstation having the docking members, the coupling members being automatically engaged with each other when the workstation is moved into the docked condition with the jig, the coupling members when engaged being operable to transfer at least one of electrical power, fluid, and data between the jig and the workstation docked therewith.

4. The modular assembly system of claim 1, wherein at least one of the workstations includes a parts storage module for storing component parts to be installed in the mechanical structures.

5. The modular assembly system of claim 1, wherein at least one of the workstations includes a platform for supporting a worker.

6. The modular assembly system of claim 1, wherein at least one of the workstations includes tools for performing drilling and fastening operations on the mechanical structures.

7. The modular assembly system of claim 6, wherein at least one of the workstations includes one or more indexing devices for positioning components to be installed in the mechanical structures so that the components can be affixed to the mechanical structures.

8. A modular assembly system for assembly of large mechanical structures, comprising:
- a stationary assembly jig positioned on a floor and operable to fix a mechanical structure in a fixed position for being worked on;
- a plurality of modular traveling workstations movable along the floor independently of one another, each workstation being operable to perform work operations on the mechanical structure; and
- a docking member on the jig and a cooperative docking member on at least one of the workstations that engages the docking member on the jig to position the workstation in a fixed predetermined position relative to the jig and hold the workstation in said predetermined position throughout work operations by the workstation.

9. The modular assembly system of claim 8, wherein one of the docking members comprises a female receptacle and the other docking member comprises a male element for fitting into the receptacle.

10. The modular assembly system of claim 8, wherein there are two said docking members on the jig and two said cooperative docking members on the workstation.

11. The modular assembly system of claim 8, further comprising cooperative coupling members on the jig and on said at least one workstation having the docking member, the coupling members being automatically engaged with each other when the workstation is docked with the jig, the coupling members when engaged being operable to transfer electrical power between the jig and the workstation docked therewith.

12. The modular assembly system of claim 8, further comprising cooperative coupling members on the jig and on said at least one workstation having the docking member, the coupling members being automatically engaged with each other when the workstation is docked with the jig, the coupling members when engaged being operable to transfer fluid between the jig and the workstation docked therewith.

13. The modular assembly system of claim 8, further comprising cooperative coupling members on the jig and on said at least one workstation having the coupling member, the coupling members being automatically engaged with each other when the workstation is docked with the jig, the coupling members when engaged being operable to transfer data between the jig and the workstation docked therewith.

14. A modular assembly system for assembly of large mechanical structures, comprising:
- at least one stationary assembly jig positioned on a floor and operable to fix a mechanical structure in a fixed position to be worked on; and
- a plurality of modular traveling workstations movable along the floor independently of one another, each workstation being operable to perform work operations on the mechanical structure;
- wherein one of the workstations comprises a cleaning station comprising two traveling modules operable to engage the assembly jig from opposite sides thereof, said modules including complementary halves of a containment shell that engage each other to enclose the mechanical structure therebetween such that spray cleaning of the mechanical structure can be performed within the containment shell.

* * * * *

UNITED STATES PATENT AND TRADEMARK OFFICE
CERTIFICATE OF CORRECTION

PATENT NO. : 6,513,231 B1
DATED : February 4, 2003
INVENTOR(S) : Hafenrichter et al.

It is certified that error appears in the above-identified patent and that said Letters Patent is hereby corrected as shown below:

Column 10,
Line 38, "workstation" should read -- workstations --;
Line 45, "clocking" should read -- docking --.

Column 12,
Line 13, "coupling" should read -- docking --.

Signed and Sealed this

Eighth Day of July, 2003

JAMES E. ROGAN
*Director of the United States Patent and Trademark Office*